United States Patent [19]

Miyaji et al.

[11] Patent Number: 5,381,066
[45] Date of Patent: Jan. 10, 1995

[54] SPINDLE MOTOR WITH A SEALING MEMBER

[75] Inventors: Itsuo Miyaji, Yokaichi; Hiroshi Matsumoto, Hikone, both of Japan

[73] Assignee: Nippon Densan Corporation, Kyoto, Japan

[21] Appl. No.: 22,514

[22] Filed: Feb. 25, 1993

[30] Foreign Application Priority Data

Feb. 28, 1992 [JP] Japan .................. 4-079055
Mar. 28, 1992 [JP] Japan .................. 4-102065

[51] Int. Cl.⁶ .............................................. H02K 5/16
[52] U.S. Cl. .................................................. 310/90
[58] Field of Search ................... 310/67 R, 90, 91; 360/97.01; 384/15

[56] References Cited

U.S. PATENT DOCUMENTS

| | | | |
|---|---|---|---|
| 4,779,165 | 10/1988 | Elsaesser et al. | 360/97 |
| 4,827,168 | 5/1989 | Nakajima | 310/90 |
| 4,894,738 | 1/1990 | Elsasser et al. | 360/97.01 |
| 4,900,958 | 2/1990 | Kitahara et al. | 310/67 R |
| 4,922,406 | 5/1990 | Schuh | 360/97.03 |
| 5,061,868 | 10/1991 | Iwazaki et al. | 310/67 R |
| 5,227,686 | 7/1993 | Ogawa | 310/90 |
| 5,245,234 | 9/1993 | Okada et al. | 310/67 R |
| 5,281,886 | 1/1994 | Ohta | 310/90 |
| 5,325,006 | 6/1994 | Uno et al. | 310/90 |

Primary Examiner—Kristine L. Peckman
Assistant Examiner—Matthew Nguyen

[57] ABSTRACT

A spindle motor comprises a stationary member, a hub which is mounted rotatably on the stationary member through a pair of bearings, a rotor magnet which is mounted on the hub, a stator located face to face to said rotor magnet and a clamp for mounting recording disks to the hub. The hub is provided with a mating protrusion for fixing the clamp, the mating protrusion is fitted with a flat end of the hub, and the clamp is fixed by mounting the flat end of the hub with a fastening screw. Further, with a sealing member being fitted on the bearing, a labyrinthine sealing structure is formed with the sealing member and the stationary member.

2 Claims, 5 Drawing Sheets

5,381,066

SPINDLE MOTOR WITH A SEALING MEMBER

FIELD OF THE INVENTION

The present invention relates to a spindle motor for driving and rotating recording members such as magnetic disks, photomagnetic disks, etc.

DESCRIPTION OF THE PRIOR ART

As a spindle motor for driving and rotating magnetic disks, there is for example one which was disclosed by the U.S. Pat. No. 4,900,958. In this instance, a pair of bearings are mounted on a stationary shaft which is a static member and the hub is rotatably supported through this pair of bearings. On this hub are fitted magnetic disks coaxially. In the upper surface of the hub, threaded holes for attaching a clamp have been provided. As the result of the clamp being screwed to the threaded holes of the hub, the magnetic disks mounted on the hub are fixed in a body with the hub. Inside the hub, a rotor magnet is provided annularly and an armature is mounted on the stationary shaft placed in the radial direction face to face to this rotor magnet.

In this kind of spindle motor, as the magnetic circuit portion comprising the stator and rotor magnet and the abovementioned pair of bearings are composed separately, the magnetic circuit portion can be obtained as a relatively large space. Because the abovementioned pair of bearings however is provided inside the hub, there arises a limitation to the space for accomodating the bearings. As the result, it becomes difficult to mount a suitable size of bearing, thus making the noises from the vibration and resonance of the bearings as well as the degree of NRRO (non repetitive run-out) larger.

Moreover, after they are cut, the threaded holes provided in the hub are generally cleansed or surface-treated for the rust prevention, but it is difficult for such cleansing or surface-treating agents to reach every corner and there was a tendency for the debris to be left behind or for the rust-preventing treatment inside the threaded holes itself to be insufficient.

Further, in the above-mentioned spindle motor, there is an opening at the side of the magnetic circuit portion located under the hub, and the inside and outside of the spindle motor communicate through this opening. Accordingly, the lubricating grease of the bearings or contaminated air inside of the hub leaks to the outside of the spindle motor, namely to the disk chamber. In order to prevent this, a labyrinthine sealing structure has been formed. Unless the labyrinth structure is formed with high accuracy however, a sufficient sealing performance is not obtained. The labor required for processing and assembling it etc. have pushed up the cost of production.

SUMMARY OF THE INVENTION

The first object of the present invention is to offer a spindle motor that easily enables making the motor itself more compact while making the vibration and noises lower.

The second object of the present invention is to offer a spindle motor that enables mounting the recording disks securely without providing threaded holes in the hub.

The third object of the present invention is to offer a spindle motor that can prevent outside scattering outside of the lubricant used in the bearings.

Other objects and the characteristics of the present invention will be made easily understandable from the following description.

DETAILED DESCRIPTION OF PREFERRED EMBODIMENTS

With reference to the drawings attached hereto, the spindle motor in accordance with the present invention will now be described.

The First Embodiment

Figure 1:
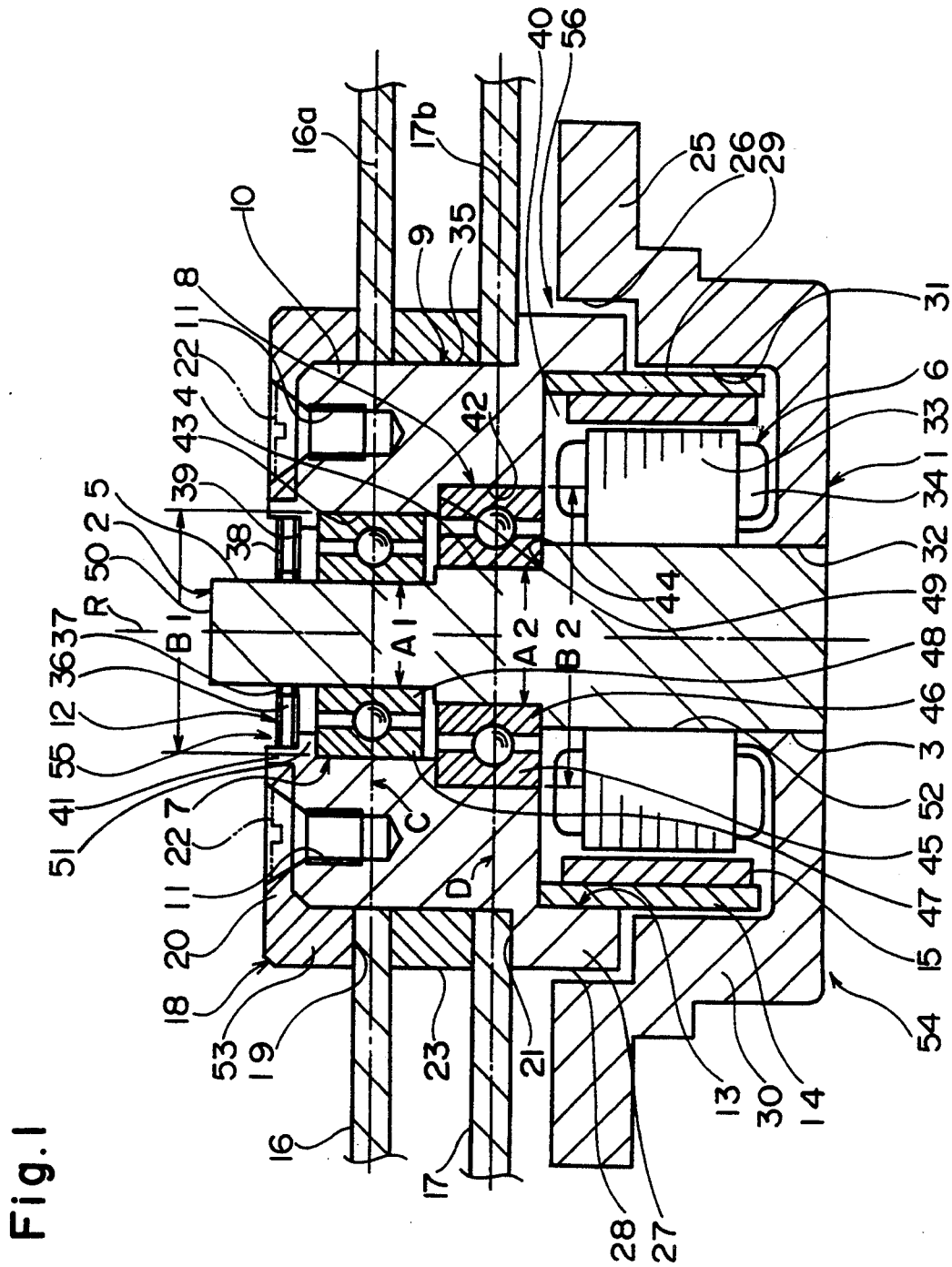
FIG. 1 is a sectional view showing the first embodiment of the spindle motor in accordance with the present invention.

With reference to FIG. 1, the first embodiment of the spindle motor in accordance with the present invention will be explained. FIG. 1 shows that the hub 9 takes the external form of a bowl made for example of aluminium material. In the lower part of the hub 9, a flange 27 has been provided, formed to project in the radial direction and through the periphery. This flange 27 has the largest outer diameter in the region of the hub and is formed coaxially. In the upper part of the flange 27 two plain doughnut-shaped magnetic disks 16 and 17 are mounted as recording disks. On top of the disk 17 the disk 16 is mounted through an intermediate ring-shaped spacer 23, and above these a clamp 18 is mounted. The clamp 18 is formed annularly, and its flat portion 20 extending in the radial direction inwardly and the depending peripheral wall 53 are integral. The clamp 18 is positioned co-axially with the hub 9 by the annular protrusion 41 formed in the upper end of the hub 9. When the clamp 18 is mounted on the hub 9, the lower end 19 of the peripheral wall 53 in the clamp 18 comes into contact with the upper surface of the magnetic disk 16. In the upper part 10 of the hub 9, a plural number of threaded holes 11 have been provided in the circumferential direction virtually at equal intervals, and these threaded holes 11 extend virtually in parallel with the axial direction. In the threaded holes 11 fastening screws 22 are screwed through the holes which have been formed in the flat portion 20 of the clamp 18. The magnetic disks 16 and 17 are thus sandwiched between the clamp 18 and the flange 27, being held as one with the hub 9.

In the hub 9, corresponding to the stepped shape of the shaft 2 to be mentioned later, a small-sized hole portion 43, middle-sized hole portion 42 and large-sized hole portion 13, each formed in a cylindrical shape, are formed coaxially. In the small-sized hole portion 43 and middle-sized hole portion 42, bearings 7 and 8 are mounted respectively. In the large-sized hole portion 13 a rotor magnet 15 is provided annularly and fixed through an intermediate cylindrical rotor yoke 14 made of ferromagnetic material. The N-poles and S-poles of the rotor magnet 15 are arranged alternately in the circumferential direction.

In the shaft 2 which holds the hub 9 rotatably, a small-sized portion 5, a middle-sized portion 4 and a large-sized portion 3 are formed in a series from above downwardly in the FIG. 1. The shaft 2 can be made of steel. The upper end of the shaft 2 is fixed to the upper plate of a magnetic disk drive (not shown in the figure). The lower end of the shaft 2 is fixed to the base of the magnetic disk drive(not shown) through the intermediate bracket 1. The lower end of the shaft 2, namely the large-sized portion 3, is fitted with a stator 6 portions 5 and 4 are fitted and with bearings 7 and 8.

The bracket 1 fixed to the shaft 2 has a circular concavity 54 opening upwardly in the FIG. 1, and in the upper part of the peripheral wall 30 which defines the concavity 54, a flat portion 25 extending outwardly in the radial direction is formed in integrally. Further, in hole 32 formed in the center of bracket 1, the large-sized portion 3 of the shaft 2 is press-fit.

For the bearings 7 and 8, ball bearings are used respectively, and they have an outer ring mounted on the hub 9, an inner ring mounted on the shaft 2 and a plurality of balls between the outer and inner rings. A pair of bearings 7, 8 are provided in different sizes as follows. The upper bearing 7 at the free end portion of the shaft 2 is provided in a smaller size than the bearing 8. The inner ring 48 fits on the smaller-sized portion 5 of the shaft 2 and is fixed while the outer ring 47 is glued to the small-sized portion 43 of the hub 9 and fixed. The upper end of the outer ring 47 is in contact with the stepped portion 51 of the hub 9 for fixing, and the vertical position in the axial direction of the bearing 7 thus is limited.

In this embodiment, the virtual center of the bearing 7 in the axial direction, namely the vertical position C corresponding to the virtual center of the balls accomodated in the bearing 7, and the center line 16a in the thickness direction in magnetic disk 16 mounted on the hub 9 are virtually coincident. In other words, a the centers of a plurality of balls of the bearing 7 and the center line of the magnetic disk 16 are virtually co-planar. The lower bearing 8 is larger than the bearing 7. The inner ring 46 of the bearing 8 is fitted on the middle-sized portion 4 of the shaft 2 and fixed while the outer ring 45 is fixed to the middle-sized portion 42 of the hub 9 by gluing etc. The vertical position of the bearing 8 in the axial direction is limited by that the lower end of the inner ring 46 contacting stepped portion 44 of the shaft 2, and the upper end of the outer ring 45 contacting stepped portion 49 of the hub. In this embodiment, the virtual center of the bearing 8 in the axial direction, namely the vertical position D corresponding to the virtual center of the balls accomodated in the bearing 8 and the center line 17a in the thickness direction of in the other magnetic disk 17 mounted on the hub 9 are in virtually coincident. In other words, the centers of a plurality of balls of the bearing 8 and the center line of the magnetic disk 17 are virtually define the co-planar.

The bearings 7 and 8 are fixed with a preload. The sizes of the bearings 7 and 8 are as follows. The inner dimension A1 (virtually the same as the outer dimension of the small-sized portion 5 of the shaft 2) of the inner ring 48 in the bearing 7 is 4 mm while the inner dimension A2 (virtually the same as the outer dimension of the middle-sized portion 4 of the shaft 2) of the inner ring 46 in the bearing 8 is 5 mm. The outer dimension B1 (virtually the same as the inner dimension of the small-sized portion 43 of the hub 9) of the outer ring 47 in the bearing 7 is 9 mm while the outer dimension B2 (virtually the same as the inner dimension of the middle-sized portion 42 of the hub 9) of the outer ring 45 in the bearing 8 is 11 mm.

The stator 6 consists of a stator core 33 into which a required number of flat electromagnetic plates of a ferromagnetic material are laminated and coils 34 wound up on the stator core 33. The stator core 33 has a plurality of magnetic teeth and the tips of the magnetic teeth are arranged face to face with the inner periphery of the rotor magnet 15 with a slight gap in the radial direction. Consequently, when current is supplied to the coils 34, the hub 9 is driven to rotate with respect to the shaft 2 (and the bracket 1) by the magnetic action of the stator 6 and rotor magnet 14.

Axially outwardly of the bearing 7, a magnetic fluid sealing means 12 is provided. The sealing means 12 is composed of a magnetic fluid holding means 55 and magnetic fluid 37. The magnetic fluid holding means 55 is composed of an annular magnet 36 and pole pieces 38 and 39 made of magnetic material sandwiching the annular magnet 36. The magnetic fluid holding means 55 is mounted on the protrusion 41 of the hub 9, and the magnetic fluid 37 is held in a small gap between the pole pieces 38, 39 and the small-sized portion 5 of the shaft 2.

On the periphery of the bracket 1 peripheral surface 28 of the flange 27 of the hub 9 and the inner peripheral surface 26 of the annular portion 25 of the bracket 1 are arranged face to face in a close proximity while the inner peripheral surface 31 of the peripheral wall 30 of the circular concavity 54 and the outer peripheral surface 29 of the rotor yoke 14 are arranged likewise face to face, and a labryinthine sealing structure 56 is thus formed. Consequently, leakage of contaminated air from the inside 40 of the spindle motor and contaminates such as lubricating agent in the bearings 7, 8 into the magnetic disk chamber 24 is positively prevented by magnetic fluid sealing means 12 and labyrinthine sealing structure 56.

The abovementioned spindle motor has the following features. The first feature consists in varying the sizes of the bearings 7 and 8 which support the hub 9 rotatably. This enables the bearings 7 and 8 to have different characteristic frequencies of their own. Consequently, the vibrations originating in the bearings are not resonant as in conventional spindle motors in which bearings of the same size are used. A substantial reduction in vibration and noise results.

The second feature consists in making the upper bearing 7 smaller than the lower bearing 8. In the upper part 10 of the hub 9 where the outer ring 47 of the bearing 7 is positioned, a plurality of threaded holes 11 for screwing the clamp 18 provided. These holes 11 occupy the upper part 10 (thick portion lying outside the bearing 7) of the hub 9. This enables effectively reducing the diameter of the upper part 10 of the hub 9.

The third feature consists in the co-planar arrangement of the virtual center of the bearing 7, (namely the vertical position C corresponding to the virtual center of the balls of the bearing 7,) and the center line 16a in the thickness direction of the magnetic disk 16 and in the co-planar arrangement of the virtual center of the bearing 8, (namely the vertical position D corresponding to the virtual center of the balls of the bearing 8,)

and the center line 17a in the thickness direction of the other magnetic disk 17. As a result, the moment of force acting on the bearings 7 and 8 by the magnetic disks 16, 17 is minimized when the hub 9 is rotated and the hub 9 is thus stably supported rotatably by the bearings.

The Second Embodiment

Figure 2:
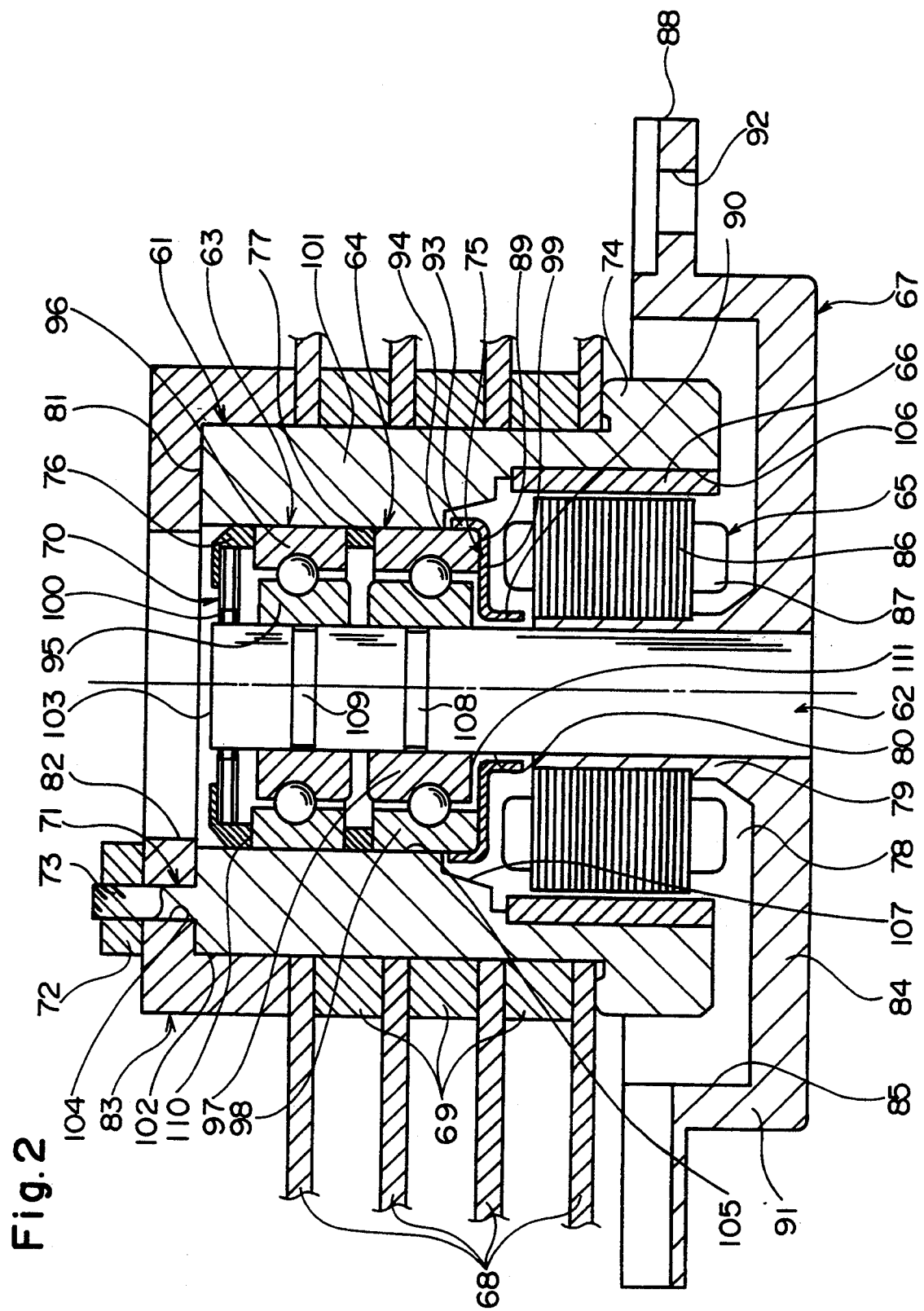
FIG. 2 is a sectional view showing the second embodiment of the spindle motor in accordance with the present invention.
Figure 3:
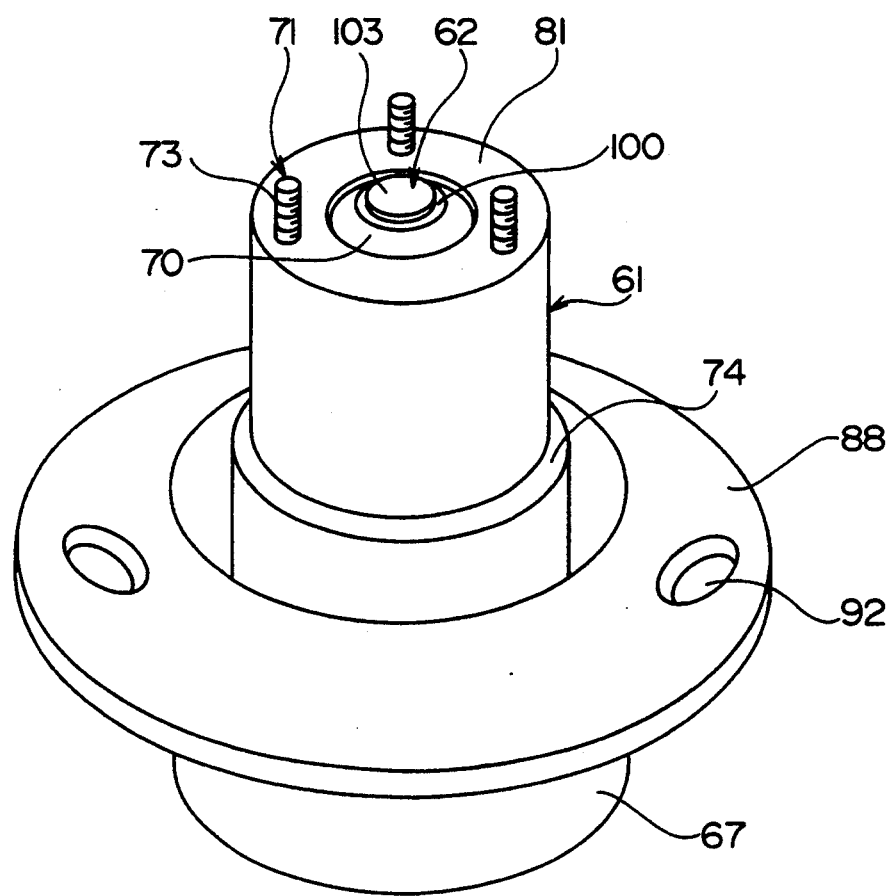
FIG. 3 is a perspective view of the spindle motor shown in FIG. 2.

With reference to FIG. 2 and FIG. 3, the second embodiment of the spindle motor in accordance with the present invention will now be explained. As is clear from FIG. 2, the fundamental construction of the spindle motor of this embodiment is roughly the same as the spindle motor of the first embodiment. After briefly explaining the points in common, the unique features of the present embodiment will be explained.

First, the member 67 is a stationary bracket, and in the upper part of the peripheral wall 91 which defines the circular concavity 84, a flat annular portion 88 extending outwardly in the radial direction is formed integrally. The portion 88 of the bracket 67 is fastened to the base of the magnetic disk drive (not shown), and the fastening screws attached through holes 92 formed in portion 88. In the central part of the circular concavity 84 of the bracket 67, a cylindrical wall 79 is formed coaxially. The cylindrical wall 79 and the shaft 62 are press-fit and fixed. Further, a stator 65 is glued to the periphery of the cylindrical wall 79. This stator 65 is composed of a stator core 86 and coils 87. In the upper part (free end portion) of the shaft 62, a pair of bearings 63 and 64 are mounted. Further, the upper end 103 of the shaft 62 is fixed to the upper frame of the magnetic disk drive (not shown). Grooves 109 and 108 in the shaft 62 are for gluing the bearings 63 and 64 in their respective positions.

The hub 61 is supported rotatably on the shaft 62 through of bearings 63 and 64. The hub 61 can be made for example of a magnetic stainless steel. Four magnetic disks 68 are mounted on flange 74 of the hub 61, with intermediate spacers 69, and the disks 68 are fixed to the hub by means of a clamp 83. The clamp 83 is fitted coaxially on the hub 61. Holes 104, provided in the clamp 83, are fitted on the externally-threaded portions 73 of protrusions 71 formed to project from the end 81 of the hub 61. By screwing nuts 72 on the externally-threaded portions 73, the clamp 83 is fixed to the hub 61. The external-threaded portions 73 provided on the hub 61 are located virtually at equal intervals in the circumferential direction on the end 81 of the hub 61 as best shown in FIG. 3.

In the inner periphery 106 of the hub 61, a rotor magnet 66 is arranged annularly and fixed. The rotor magnet 66 is arranged in the radial direction face to face with the stator 65 with an intermediate slight gap. Further, on the upper part of the inner periphery 105 of the hub 61, a magnetic fluid sealing means 70 is mounted through holding member 76. The holding member 76 can be made of a magnetic material such as steel. Magnetic fluid 100 is held by the periphery 80 of the shaft 62 with the magnetic fluid sealing means 70. On the upper side of bearing 63, the spindle motor is thus sealed in both axial directions.

On the lower side of the other bearing 64, on the other hand, an annular sealing member 75 is fitted on and surrounds the periphery 94 of the outer ring 98. Accordingly, as the sealing member 75 is fixed to the outer ring 98, it can rotate with the hub 61. The sealing member 75 has a large-sized first annular wall 93 fitted on the periphery 94 of the outer ring 98, a disk-like flat portion 99 in contact with the end 89 of the outer ring 98 and a second wall 90 provided at the inner periphery of the flat portion 99. So that the annular wall 93 of the sealing member 75 may not come in contact with the inner periphery 105 of the hub 61, a tapered inner periphery 107 is formed in the inner periphery 105 of the hub 61. The wall 90 of the sealing member 75 and the periphery 80 of the shaft 62 are arranged face to face in the radial direction with a slight gap. Further, the flat portion 99 of the sealing member 75 and the lower end 111 of the inner ring 97 in the bearing 64 are arranged face to face in the axial direction with a slight gap. Accordingly, a labyrinthine sealing structure is formed with these components and the interior of the spindle motor is thus virtually sealed outside the bearing 63. Constructed as mentioned above, the inside of the spindle motor including the bearings 63 and 64 is virtually closed with the magnetic fluid sealing means 70 and above-mentioned labyrinthine sealing structure, and the leakage of contaminants such as lubricating agent of the bearings 63 and 64 is prevented.

In the second embodiment, as the upper end 103 of the shaft 62 is fixed to the upper frame of the magnetic disk drive (not shown), holes 82 having been provided in the clamp 83. In the case of a spindle motor however, where the shaft 62 is not fixed to the above mentioned upper frame, clamp 83 can for instance take a shape not having the hole 82. If a clamp like this is used, the clamp itself can close the upper part of the spindle motor in addition to its role of holding the magnetic disks. Consequently, the abovementioned magnetic fluid sealing means 70 can be eliminated.

Next, the features of the spindle motor in the second embodiment will be explained. The first feature consists in externally-threaded portions 73 formed to project from the end 81 of the hub 61 to fix the clamp 83. Hubs of conventional type were provided with threaded holes for fastening the clamp by screwing. Consequently, it was hard for treatment liquids for cleansing or surface-treatment to reach every corner inside the threaded holes. Debris or dirt tended to be left behind inside the threaded holes. Contrary to this, in the spindle motor of the present embodiment, as externally-threaded portion 73 have been provided on the hub 61, it has become extremely easy to effect the above-mentioned cleansing and surface-treatment after processing the hub, and such detergents or treatment liquids act on the external-threaded portions 73 without fail.

The second feature consists in that the sealing member 75 is mounted on the outer ring 98 of the bearing 64. As the sealing member 75 is located in a close proximity to the axis of the hub 61, the sealing member does not have to be of high accuracy. In the present embodiment particularly, in the case where the sealing member 75 is mounted on the outer ring 98 of the bearing 64, no provision of means of fixing it is required on the inner periphery of the hub 61. As the bearing 64 itself is composed of outer and inner rings with a specified high accuracy, one can utilize the outer ring 98 processed to have a high dimensional accuracy as it is. Consequently, in constructing the labyrinthine sealing structure associated with the shaft 62 by mounting a sealing member 75 on the shaft 62, dimensional accuracy of the above-mentioned hub 61 or sealing member 75 itself is not required at such a high level, and on the other hand, a high labyrinthine sealing performance can be attained.

The Third Embodiment

Figure 4:
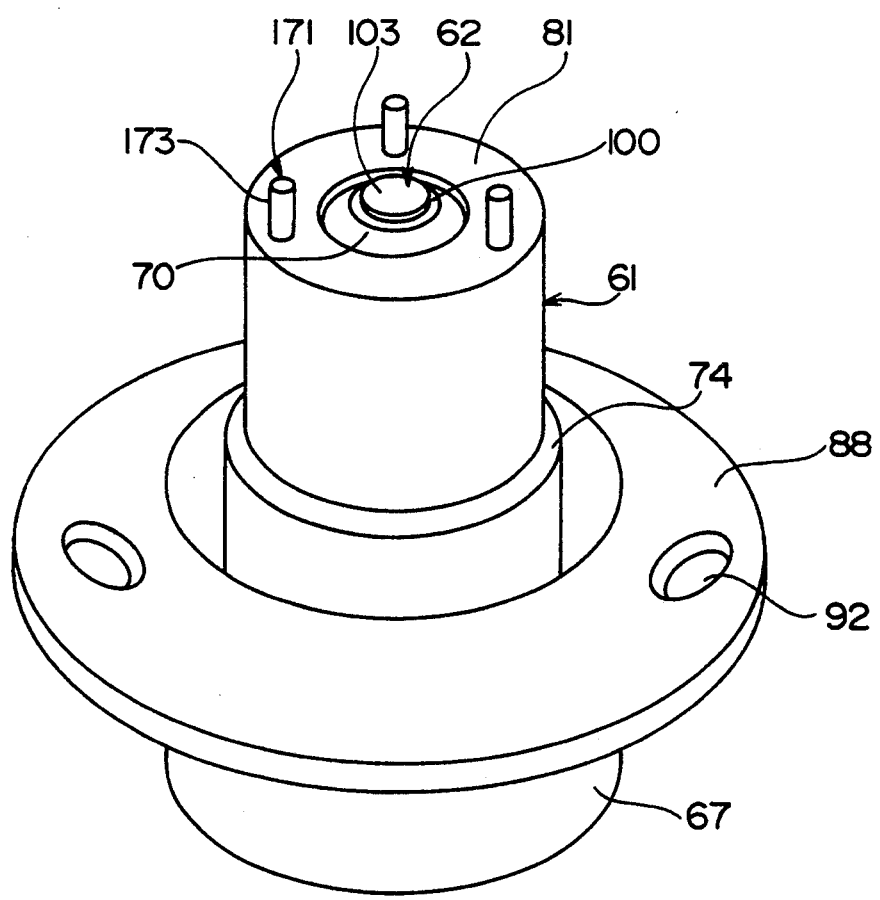
FIG. 4 is a perspective view showing the third embodiment of the spindle motor in accordance with the present invention.
Figure 5:
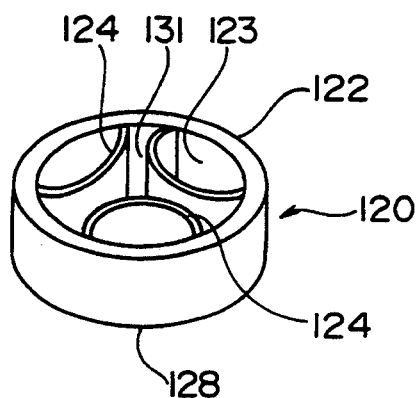
FIG. 5 is a perspective view showing the clamp to be mounted on the hub of the spindle motor shown in FIG. 4.
Figure 6:
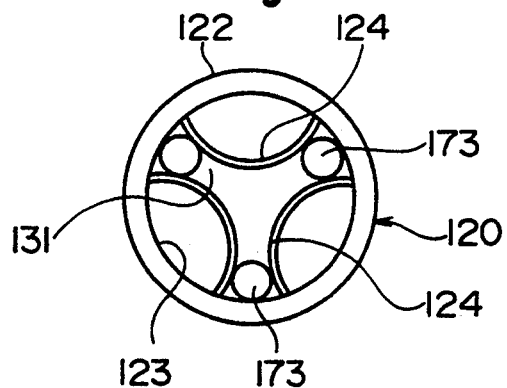
FIG. 6 is a plane view showing how the clamp is mounted on the hub of FIG. 5.

With reference to FIG. 4 to 6, the third embodiment of the spindle motor in accordance with the present invention will be explained. With the structure for fastening the clamp to the hub of the spindle motor having been improved, the third embodiment represents almost the same construction. The same numbers will be used for the explanation for the same members as in the second embodiment.

In the third embodiment, when a cap 120 is fitted on the protrusions 173 as mating protrusions 171 formed to project from the end of the hub 61, the cap is held and thereby the magnetic disks mounted on the hub 61 are press-fixed. In the second embodiment, the clamp 83 is fixed to the hub 61 as the nuts 72 are fitted on the external-threaded portions 73. Contrary to this, as fixing takes place only by fitting the cap 120 on the protrusions 173 of the hub 61, the mounting procedure is simple.

In FIG. 4 and FIG. 5, the cap 120 has a cylindrical cap body 122, and the dimension of its inner peripheral surface 123 has been set at virtually a same value as the maximum outer dimension of the circle about the three protrusions 173 arranged on the hub 61. On its inner peripheral surface 123, an elastic member 124 is provided for press-fitting to hold the protrusions 173 upon which it is fitted. The elastic members 124 are provided to correspond to the circumferential positions of the protrusions 173 arranged at three places on the hub 61. More particularly, the elastic members 124 are made of spring material and formed roughly in a semi-circular shape. The individual elastic members 124 are arranged inside the cap body 122 virtually at the same intervals in the circumferential direction, and a specified gap 131 is provided between the neighboring elastic members 124. When the cap 120 is fitted on the protrusions 173, corresponding to the individual protrusions 173, the neighboring elastic members 124 press-hold the protrusions 173. Accordingly, the lower end 128 of the cap 120 comes in contact with the upper end of the hub 61 to position the cap 120, and the elastic members 124 and the protrusions 173 of the hub 61 are held elastically.

Moreover, one can arrange for a mating concavity in each protrusion 173 to mate, when the cap 120 is mounted, the cap body 122 and the elastic member 124 are engaged with the above-mentioned concavity.

Figure 7:
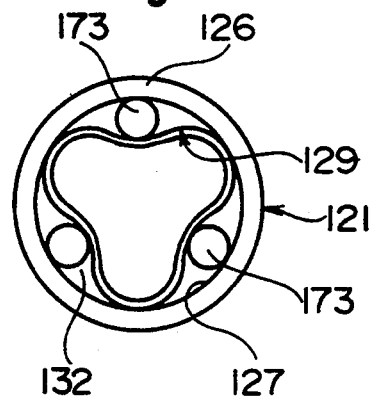
FIG. 7 is a plane view showing how the clamp of the instance of a variation is mounted on the hub.

FIG. 7 shows a variation of the cap 121. The cap 121 differs from the cap 120, but exerts virtually the same action. The elastic member 129 of the cap 121 has roughly the form of a triangle. Between the inner periphery surface 127 of the cylindrical cap body 126, and the elastic member 129, corresponding to the protrusions 171, gap 132 is provided extending in the radial direction. The maximum value of the gap 132 has been set to be slightly smaller than the outer dimension of the protrusion 173. Consequently, when the cap 121 is fitted on the protrusions 173 of the hub 61, the elastic member 129 frictionally engages the protrusions and as a result the cap 121 is held by the hub 61.

The caps 120 and 121 in the third embodiment have been provided corresponding to the protrusions 173 provided at three places protruding from the hub 61. However, within the scope present embodiment, subject to a varying number of the protrusions, the construction of the above-mentioned caps 120,121 can be varied correspondingly. Various embodiments of the spindle motor in accordance with the present invention have been explained, but the present invention is not confined to these embodiments and can be varied or modified variously within the scope of the present invention.

We claim:

1. A spindle motor comprising a stationary member, a shaft mounted on said stationary member, a hub which is mounted through a pair of bearings rotatably on said shaft and on which at least one recording disk is mounted, a rotor magnet mounted on said hub and a stator provided face to face with said rotor magnet, wherein at least one of the pair of bearings comprises an outer ring to be fitted on the hub, an inner ring to be fitted on said shaft and a plurality of balls between said outer ring and said inner ring, a seal member is provided on said at least one of the pair of bearings, said seal member comprises a disk-like flat portion, a large-sized first annular wall provided on an outer periphery of said flat portion and a small-sized second annular wall provided on an inner periphery of said flat portion, and the large-sized first annular portion is fitted on the outer ring of the at least one of the pair of bearings to define a small gap between said flat portion and said inner ring and between the second small-sized annular wall and the shaft respectively.

2. A spindle motor according to claim 1, wherein said at least one of the pair of bearings is located adjacent the stationary member.

* * * * *